(12) United States Patent
Albrecht et al.

(10) Patent No.: US 10,061,955 B2
(45) Date of Patent: Aug. 28, 2018

(54) PROXIMITY-BASED LINKING FOR WEARABLE GROUP COMMUNICATION DEVICE

(71) Applicant: Orion Labs, San Francisco, CA (US)

(72) Inventors: Greg Albrecht, San Francisco, CA (US); Ellen Juhlin, San Francisco, CA (US); Dan Phung, San Francisco, CA (US); Schuyler Erle, San Francisco, CA (US)

(73) Assignee: Orion Labs, San Francisco, CA (US)

( * ) Notice: Subject to any disclaimer, the term of this patent is extended or adjusted under 35 U.S.C. 154(b) by 0 days.

(21) Appl. No.: 15/461,830

(22) Filed: Mar. 17, 2017

(65) Prior Publication Data

US 2017/0270330 A1    Sep. 21, 2017

Related U.S. Application Data

(60) Provisional application No. 62/310,113, filed on Mar. 18, 2016, provisional application No. 62/310,106, (Continued)

(51) Int. Cl.
*H04B 5/00* (2006.01)
*G06K 7/12* (2006.01)
(Continued)

(52) U.S. Cl.
CPC .............. *G06K 7/12* (2013.01); *G06F 3/0482* (2013.01); *G06K 7/10732* (2013.01); *G06K 7/1404* (2013.01); *G06K 19/06009* (2013.01); *H04L 65/1066* (2013.01); *H04W 4/008* (2013.01); *H04W 4/80* (2018.02); *H04W 76/02* (2013.01); *H04W 76/10* (2018.02); *G06F 3/0488* (2013.01); *G06F 3/0489* (2013.01); *G06F 3/04817* (2013.01); *G06F 3/167* (2013.01)

(58) Field of Classification Search
USPC .............. 235/455; 340/686.6; 455/41.1, 41.2
See application file for complete search history.

(56) References Cited

U.S. PATENT DOCUMENTS

2009/0195402 A1*  8/2009  Izadi ................... H04W 76/023
                                                         340/686.6
2013/0234850 A1    9/2013  Lee et al.
(Continued)

*Primary Examiner* — Daniel Hess

(57) ABSTRACT

Systems, methods, software and apparatus enable linking of a wearable end user communication device (EUD) to an intermediate communication device (ICD) utilizing optical symbol sequence matching. Optical symbol reference data corresponding to an optical symbol sequence displayed on the EUD is obtained from the EUD by the ICD. Optical symbol input data is also acquired by the ICD (e.g., via user inputs, EUD device proximity data, image acquisition). The devices are linked if the optical symbol reference data and optical symbol input data match. The optical symbol reference data can be displayed, allowing user confirmation of a match with the optical symbol sequence displayed on the EUD. An ICD user interface touchscreen can present users with selectable color inputs to replicate the optical symbol sequence displayed on the EUD, for example using an LED array. Communications between the devices before and after linking can utilize Bluetooth low energy.

20 Claims, 10 Drawing Sheets

Related U.S. Application Data filed on Mar. 18, 2016, provisional application No. 62/310,100, filed on Mar. 18, 2016.

(51) Int. Cl.
| | | |
|---|---|---|
| *H04L 29/06* | (2006.01) | |
| *H04W 4/00* | (2018.01) | |
| *H04W 76/02* | (2009.01) | |
| *G06K 19/06* | (2006.01) | |
| *G06K 7/10* | (2006.01) | |
| *G06K 7/14* | (2006.01) | |
| *G06F 3/0482* | (2013.01) | |
| *H04W 76/10* | (2018.01) | |
| *H04W 4/80* | (2018.01) | |
| *G06F 3/0488* | (2013.01) | |
| *G06F 3/16* | (2006.01) | |
| *G06F 3/0489* | (2013.01) | |
| *G06F 3/0481* | (2013.01) | |

(56) References Cited

U.S. PATENT DOCUMENTS

| | | |
|---|---|---|
| 2014/0073252 A1 | 3/2014 | Lee et al. |
| 2014/0242908 A1 | 8/2014 | Rosenberg |
| 2016/0021687 A1 | 1/2016 | Granbery |
| 2016/0150350 A1* | 5/2016 | Ingale ............... H04L 67/12 370/255 |
| 2016/0254946 A1* | 9/2016 | Prevost ............. H04L 41/0803 |
| 2017/0237488 A1 | 8/2017 | Aoyama et al. |

* cited by examiner

PROXIMITY-BASED LINKING FOR WEARABLE GROUP COMMUNICATION DEVICE

RELATED APPLICATIONS

This application hereby claims the benefit of and priority to the following, each of which is incorporated by reference in its entirety (including any appendices thereto): U.S. Provisional Patent Application 62/310,113, entitled "IMAGE-BASED LINKING FOR WEARABLE GROUP COMMUNICATION DEVICE," filed 18 Mar. 2016; U.S. Provisional Patent Application 62/310,106, entitled "PROXIMITY-BASED LINKING FOR WEARABLE GROUP COMMUNICATION DEVICE," filed 18 Mar. 2016; and U.S. Provisional Patent Application 62/310,100, entitled "LINKING FOR WEARABLE GROUP COMMUNICATION DEVICE," filed 18 Mar. 2016.

TECHNICAL FIELD

Aspects of the disclosure are related to communications and, in particular, to end user devices and applications for efficient communications.

TECHNICAL BACKGROUND

Various devices permit linking one communication device to another to permit communications between the devices. In some communication systems, an endpoint device in a communication system can be an end user device that allows a user to communicate with other endpoint devices via one or more intermediate communication devices and a communication network or the like. For example, a wearable end user device can be linked to an intermediate communication device (e.g., a cellphone, smartphone, gaming device, tablet, laptop or other computer) that in turn is connected to a communication network that permits a user of the end user device to communicate verbally or otherwise with other devices connected to the network. When both the end user device and its associated intermediate communication device are portable devices, external markings on the devices (e.g., serial numbers, media access control (MAC) addresses, etc.) may be printed in small type or be difficult to locate. Moreover, linking an end user device with an intermediate communication device in a crowded area (i.e., an area with many linking and/or linkable communication devices) may be difficult because a list of available device identifiers presented to a user on an intermediate communication device might include numerous potential connections and thus be difficult to manage.

As a result, it would be advantageous to facilitate linking an end user device to another communication device in a manner that is simple and reliable for users and that assists the user in connecting to the correct end user device.

Overview

Implementations of linking a wearable group communication device to another communication device utilize optical symbol sequence communication linking that can use lights, light-emitting diodes (LEDs), and/or other optical symbol sequence-generating and/or displaying devices that provide users with visually perceptible symbols on both an end user device and the display system of an associated intermediate communication device. A communication application on the intermediate communication device can be configured to collect optical symbol reference data (representing an optical symbol sequence) derived from identifying data transmitted from an associated end user device (e.g., an end user device to which a user wishes to link the intermediate communication device). In some implementations the end user device displays the optical symbol sequence so that a user can match the displayed sequence by entering the same optical symbol sequence using a user interface on the intermediate communication device (e.g., as optical symbol input data). The communication application can compare the optical symbol reference data and the optical symbol input data and, if they match, can then enable and initiate a communication connection between the end user device and the intermediate communication device. In some implementations, the end user and intermediate communication devices can utilize Bluetooth low energy (one or more versions of which may be referred to as "Bluetooth LE," "BLE," and/or "Bluetooth Smart") to exchange information during pre-connection data exchange between devices in at least a portion of the linking process.

In other implementations the intermediate communication device has a display system that pre-populates a user interface graphical depiction of an optical symbol sequence corresponding to the identifying data (i.e., optical symbol reference data) from the nearest end user device. The user can confirm that the pre-populated optical symbol sequence on the intermediate communication device display system matches the optical symbol sequence displayed on the end user device to enable the intermediate communication device to initiate a communication connection with the end user device. In still other implementations the intermediate communication device includes an optical data acquisition device that can generate optical symbol sequence image data captured from the end user device's displayed optical symbol sequence. Optical symbol input data can be derived from this image data and compared to the optical symbol reference data received from the end user device to determine the correct end user device.

This Overview is provided to introduce a selection of concepts in a simplified form that are further described below in the Technical Disclosure. It may be understood that this Overview is not intended to identify or emphasize key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
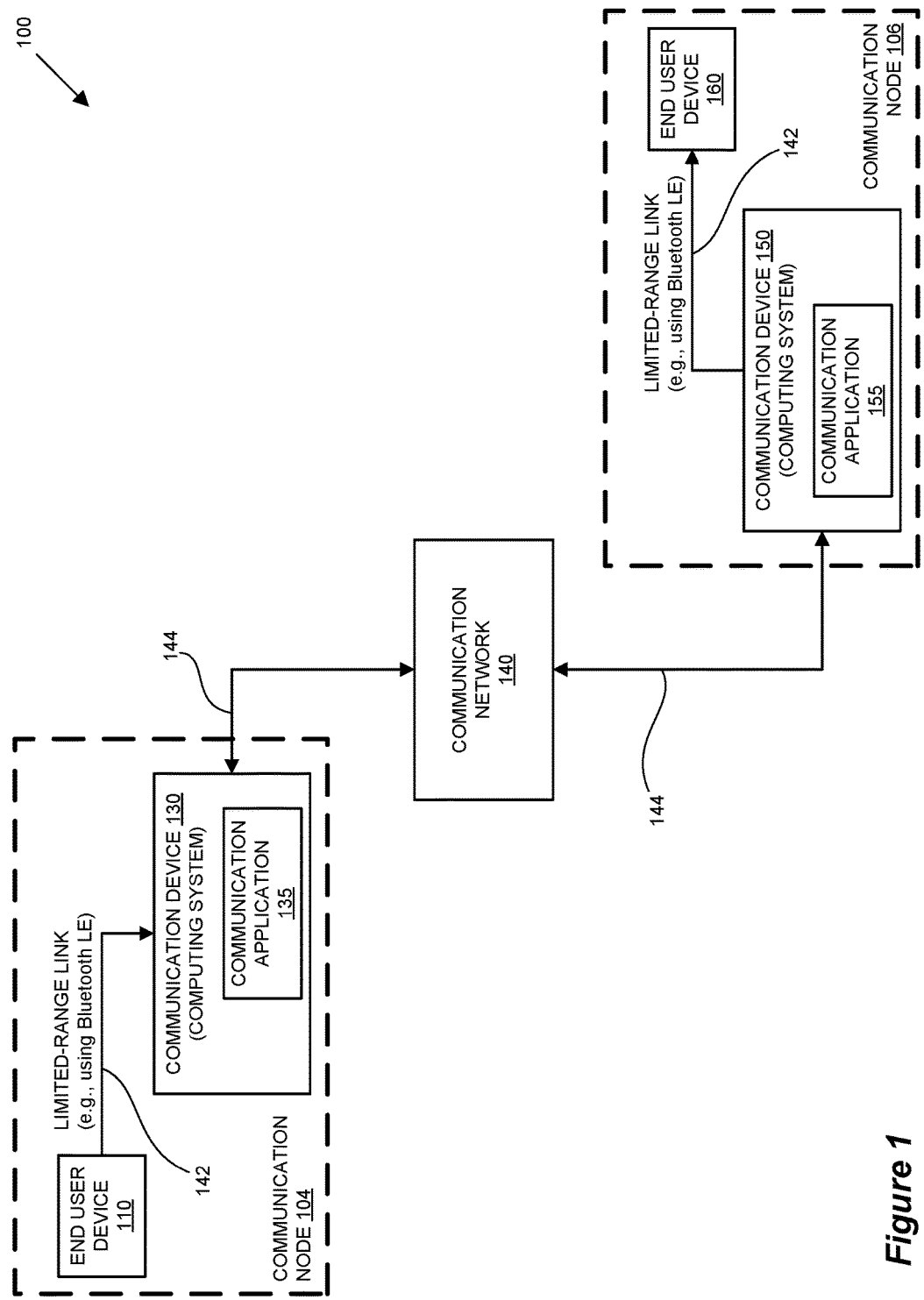
FIG. 1 illustrates one or more exemplary systems configured to facilitate secure communications using optical symbol sequence communication linking of devices.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Some services offered over local communication links (e.g., Bluetooth, Bluetooth low energy) may expose private information or data, or may allow a connecting party to control one of the devices involved in such communications (e.g., a Bluetooth device). Security and other reasons thus make it advisable to identify and verify specific devices prior to connecting to such devices and/or exchanging sensitive and/or other data with such devices. It also is helpful for communication devices to be able to establish a connection without undue user inconvenience and difficulty, especially when a user is on the go or in an active communication and/or linking setting. Bluetooth low energy communication connections can be established using a BLE device's advertising function for device discovery, and subsequent communications between a searching device and a discovered device can establish a BLE connection between the correct pair of devices. Generally, devices implementing limited-range Bluetooth low energy connect by utilizing a discovery and connection process in which one or more Generic Access Profile (GAP) peripheral devices advertise their availability to a GAP central device. The GAP central device can then request a connection with a specific GAP peripheral, after which the GAP central device becomes the BLE Generic Attribute Profile (GATT) client and the GAP peripheral device becomes the BLE GATT server. The connected devices may then exchange messages and other data utilizing the BLE attribute protocol.

Some implementations of optical symbol sequence (OSS) communication linking are used in a communication system that allows wearable group communication end user devices (e.g., two-way audio communication devices that include a speaker and a microphone) to communicate with one another via their respective intermediate communication devices and a communication network. In such systems that utilize BLE or similar limited-range communication to connect each end user device to an associated (e.g., Bluetooth paired) intermediate communication device, an end user device can be characterized as a GAP peripheral device that advertises its availability to establish a connection with its associated intermediate communication device (which can be characterized as a GAP central device). In some communication linking schemes, the intermediate communication device may be the component that advertises its availability to connect to an end user device.

Implementations of OSS communication linking disclosed and claimed herein provide apparatus and methods for facilitating linking an end user device with a communication device using optical symbol data to verify the end user device's identity prior to connection between the devices. Implementations allow users to make quick, simple connections without the need for long strings of data or other verification information that may be difficult and/or inconvenient to provide. Instead of compelling a user to verify or confirm a connection using serial numbers, alphanumeric strings, etc., or having to select from multiple device identifiers, some implementations of OSS communication linking use optical symbols as a proxy for more complex device identifiers.

Optical symbols include any optically perceptible symbols and may, in some implementations, include symbols whose color, brightness or other state is normally perceptible by a human user operating an end user device or the like. Optical symbol reference data received by an intermediate communication device is confirmed prior to commencing a communication connection between the devices. Confirmation of the optical symbol reference data can be achieved in various implementations. Optical symbol reference data can be derived from identifying data contained in availability information that is broadcast or otherwise transmitted by an end user device and received by an intermediate communication device. That is, an end user device can broadcast availability information regarding its availability for linking with other devices. Identifying data can be included as part of that availability information; the identifying data can be used to derive the optical symbol reference data. The intermediate communication device also obtains optical symbol input data (e.g., receiving inputs via a user interface, or obtained from image data acquired by the intermediate communication device) that can be compared to the optical symbol reference data. In some implementations a user can confirm or reject the optical symbol reference data rather than separately inputting distinct optical symbol input data.

FIG. 1 illustrates one or more implementations of a communication system 100 configured to facilitate, among other things, optical symbol sequence (OSS) communication linking of an end user device to an intermediate communication device, for example in a system that enables secure audio communications between endpoint devices (e.g., end user devices) on a communications network. System 100 includes exemplary communication node 104 (which includes endpoint end user device 110 and communication device 130 (e.g., an intermediate communication device that also may be referred to as a computing system)), exemplary communication node 106 (which includes endpoint end user device 160 and communication device 150 (e.g., another intermediate communication device that also may be referred to as a computing system)), and communication network 140 linking nodes 104, 106. As will be appreciated by those skilled in the art, additional nodes, endpoint devices, end user devices and intermediate communication devices can be interconnected via communication network 140.

In implementations where communication devices 130, 150 are intermediate communication devices, intermediate communication device 130 (also referred to as an "ICD") can be a computing system (e.g., a cellphone, smartphone, gaming device, tablet, laptop or other computer) in communication node 104 that communicates with its associated end user device 110 over a limited-range communication link 142 (e.g., Bluetooth low energy), and further communicates outside node 104 using communication network 140 over one or more communication network links 144. ICD 150 also can be a computing system (e.g., a cellphone, smartphone, gaming device, tablet, laptop or other computer) in communication node 106 that also communicates with its associated end user device 160 using a limited-range communication link 142, and further communicates outside node 106 using communication network 140 over communication network link 144.

Limited-range links 142 can be used, as described in more detail herein, to perform linking of an end user device with its associated intermediate communication device using OSS communication linking. The communication link 144 that connects intermediate communication device 130 to communication network 140 can use one or more of Time Division Multiplexing (TDM), asynchronous transfer mode (ATM), IP, Ethernet, synchronous optical networking (SONET), hybrid fiber-coax (HFC), circuit-switched, communication signaling, wireless communications, or some other communication format, including improvements thereof. Link 144 connecting intermediate communication device 150 to network 140 can operate similarly. Communication links 144 each use metal, glass, optical, air, space, or some other material as the transport media and may each be a direct link, or can include intermediate networks, systems (including one or more management service systems), or devices, and can include a logical network link transported over multiple physical links.

Each ICD 130, 150 may comprise a computing system capable of running a communication application and communicating with network 140 using the Internet or some other widespread communication network. Each of ICDs 130, 150 can include at least one user interface that allows a user to enter data and interact with communication application 135, 155, respectively. When transmitting and receiving data, communication devices 130, 150 and the like can use an appropriate data transfer scheme.

Communications network 140 can comprise a server system utilizing one or more computing devices capable of providing communication services to a plurality of communication nodes and their respective endpoint devices, such as end user devices 110, 160. End user devices 110, 160 (also referred to as "EUDs") may each comprise a speaker, microphone, processing system, communication interface, and a user interface to exchange communications with ICDs 130, 150, respectively, and thus with communications network 140 and other endpoint devices of various types. In implementations of OSS communication linking, at least one EUD has an at least one OSS display capability (e.g., one or more lights and/or LEDs; a color sequence on a sticker, label or decal applied to the end user device; other display capabilities may also be implemented).

Figure 2A:
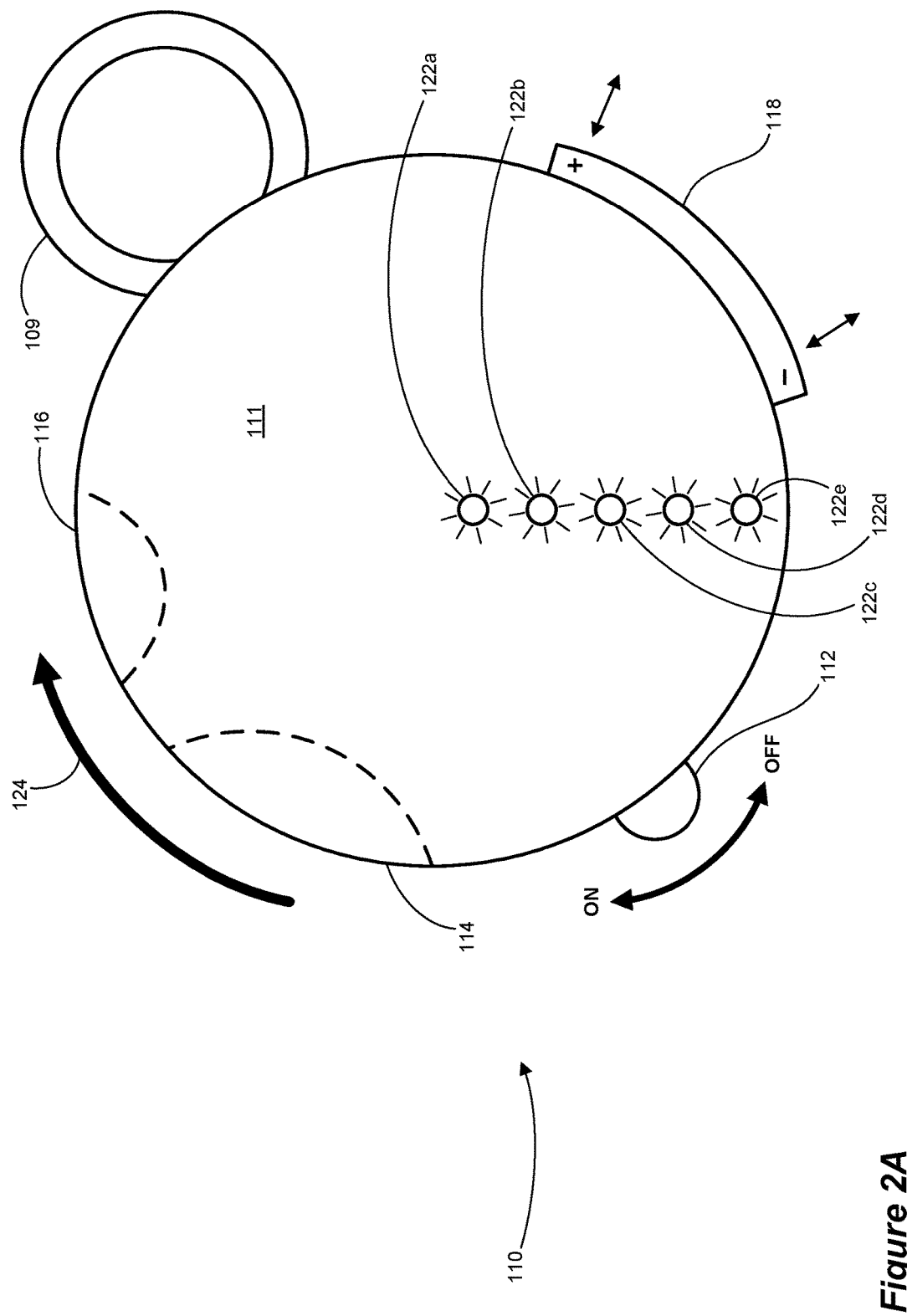
FIG. 2A is a top view of one or more end user devices configured to be part of optical symbol sequence communication linking of devices.
Figure 2B:
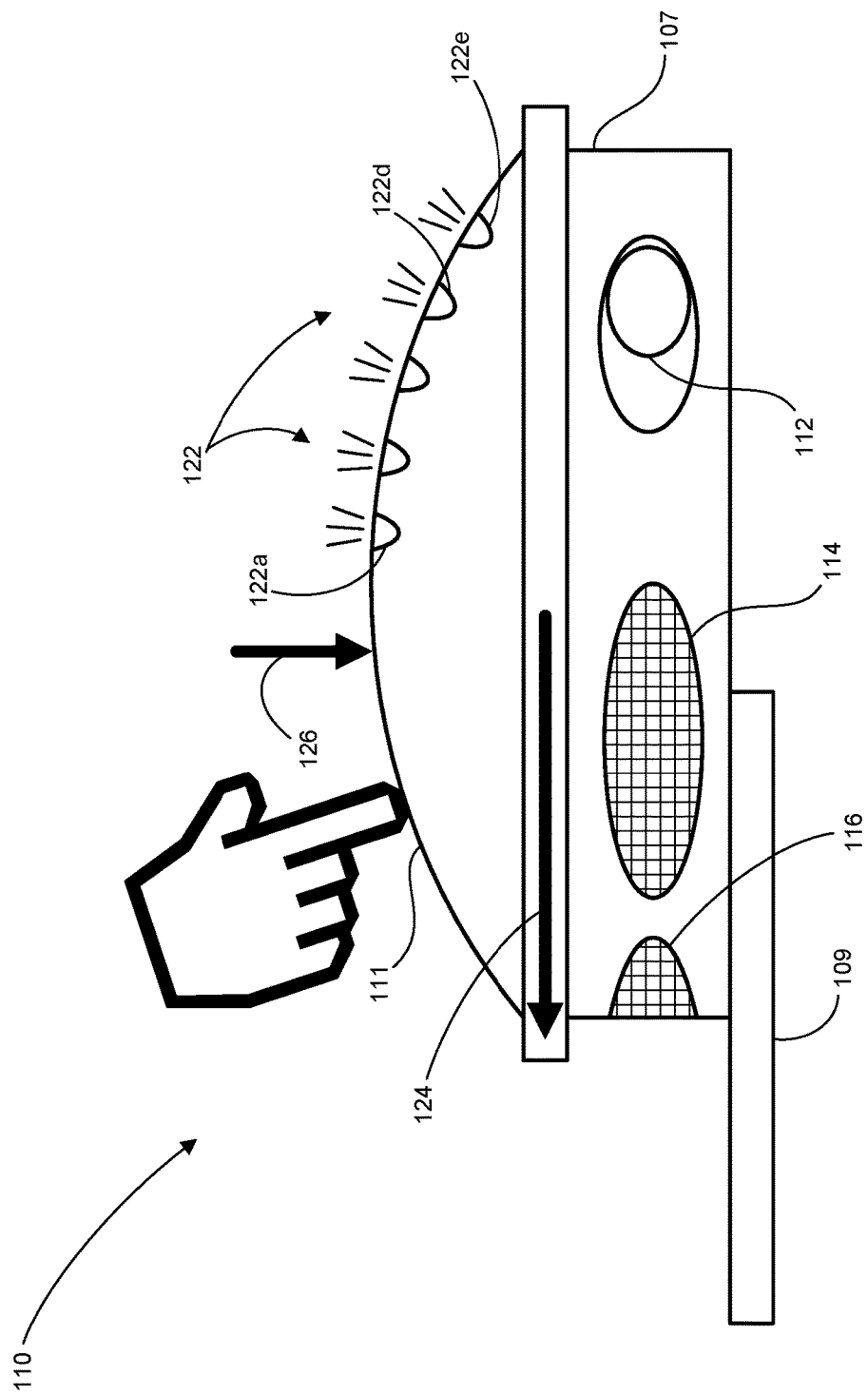
FIG. 2B is a side view of one or more end user devices configured to be part of optical symbol sequence communication linking of devices.

The endpoint devices of network 140 include EUDs 110, 160, each of which can be a highly portable (e.g., wearable) communication device. One non-limiting example of EUD device 110 is shown in FIGS. 2A and 2B. Device 110 has a top cover 111 that can be generally circular in shape, as shown in FIG. 2A, or can be any other shape. In the non-limiting example of FIGS. 2A and 2B, end user device 110 uses the generally circular shape to facilitate certain operations and to permit the positioning of certain functions and components, which also can be performed and implemented in alternative ways in other configurations. Referring to FIG. 2B, device 110 includes a generally cylindrical base 107 and a generally convex cover 111 (e.g., having a quasi-conical shape or a cup-like shape).

Base 107 has an attachment mechanism 109 (e.g., a clip or clasp) mounted thereon to permit attachment of device 110 to clothing, a backpack or another personal item that facilitates audio communications (e.g., a conversation with another user) by a user while wearing device 110. Various functional components of EUD 110 can be situated around the periphery of base 107, as seen in FIGS. 2A and 2B. A master power switch 112 can turn device 110 on and off (as distinguished from turning on and off BLE advertising, as discussed herein). A speaker 114 is built in to base 107, as is a microphone 116, each of a type and size that again facilitates and enables conversation by a user wearing device 110 in some implementations. A volume control 118 permits adjustment of the sound level generated by speaker 114 (e.g., lowering sound level by depressing the "–" end of control 118 and increasing sound level by depressing the "+" end). Other components and/or features (e.g., a micro and/or other Universal Serial Bus (USB) port, headphone jack, mute button or switch) can also be positioned around the periphery of or elsewhere on device 110.

Cover 111 can be made of plastic or any other suitable material and includes an OSS display 122 which in FIGS. 2A and 2B is a non-limiting exemplary LED array that includes individually addressable multi-color LEDs 122a, 122b, 122c, 122d, 122e. In other implementations, the optical symbol sequence displayed on end user device 110 can be a color sequence on a sticker, label or decal applied to the end user device 110. LED array 122 operates as described in various implementations of OSS communication linking discussed herein. Cover 111 is attached to base 107 in a manner that permits limited rotation of cover 111 relative to base 107, as referenced by arrow 124 in FIGS. 2A and 2B.

In operation in some implementations, including one or more illustrated in FIG. 1 and using an end user device as illustrated in FIGS. 2A and 2B, the master device power 112 is turned on. When a user wishes to use EUD 110 for communicating via an ICD 130, cover 111 is rotated clockwise relative to base 107 to initiate broadcast of availability information to inform certain other devices in the vicinity of end user device 110 of its availability for communications and to provide relevant identifying data and/or other information that can assist in enabling such communications (counterclockwise rotation of cover 111 can turn off availability broadcasting). In some implementations of OSS communication linking, rotation of cover 111 turns on BLE advertising in EUD 110, which then broadcasts its availability information in a manner that can be detected and received by other devices, including ICD 130. In such BLE-based implementations, when ICD 130 scans for BLE devices to which it might connect, it can receive advertising packets broadcast by EUD 110. In broadcasting availability information using BLE, at least part of the payload data in the advertising packets includes identifying data such as a serial number, MAC address, and/or other alphanumeric characters, text, or the like that functions as an identifier of EUD 110. When activated to broadcast BLE advertising packets or the like, EUD 110 also can illuminate an optical symbol sequence (e.g., using array 122 to provide a sequence of colors). This optical symbol sequence can be displayed when BLE advertising is activated or in response to a prompting transmission from ICD 130.

The identifying data contained and/or included in the availability information transmitted by EUD 110 and received by ICD 130 can be converted by communication application 135 into optical symbol reference data (e.g., a byte array, binary string or other data structure) that represents a reference optical symbol sequence. Optical symbol reference data can be derived from the identifying data by applying an appropriate algorithm or data conversion process, or in any other way that yields a suitable data value, structure, size, etc. for use as optical symbol reference data.

The light sequence that can be displayed on array 122 of device 110 may include multi-color lights or LEDs. In a non-limiting example, each LED 122a, 122b, 122c, 122d, 122e can emit one of three colors (e.g., white, red or blue). In some implementations a light or LED being "off" also can constitute a color usable in an optical symbol sequence, as can a light or LED blinking (including blinking at different speeds, each of which can likewise constitute a color usable in an optical symbol sequence).

Communication application 135 can display a graphical user interface (GUI) on ICD 130 (e.g., using a touchscreen or other display system on device 130). Such a GUI can permit data entry or confirmation of verification data by a user (e.g., by "typing in" or "tapping in" a color sequence that matches the optical symbol sequence being displayed as a graphical depiction corresponding to optical symbol reference data on EUD 110) or by confirming a pre-populated optical symbol sequence being displayed on the user interface. User-entered verification data and OSS data on ICD 130 can be processed (e.g., converted into optical symbol input data), so that the optical symbol input data has a data structure that allows it to be compared to optical symbol reference data to determine whether or not they match (and thus whether the optical symbol sequence on EUD 110 matches the optical symbol sequence on the display system of ICD 130). If the user-input optical symbol input data and optical symbol reference data match, then ICD 130 can send a BLE connection request or other invitation to connect to EUD 110, which it can answer with a response, thus connecting EUD 110 and ICD 130.

Figure 3:
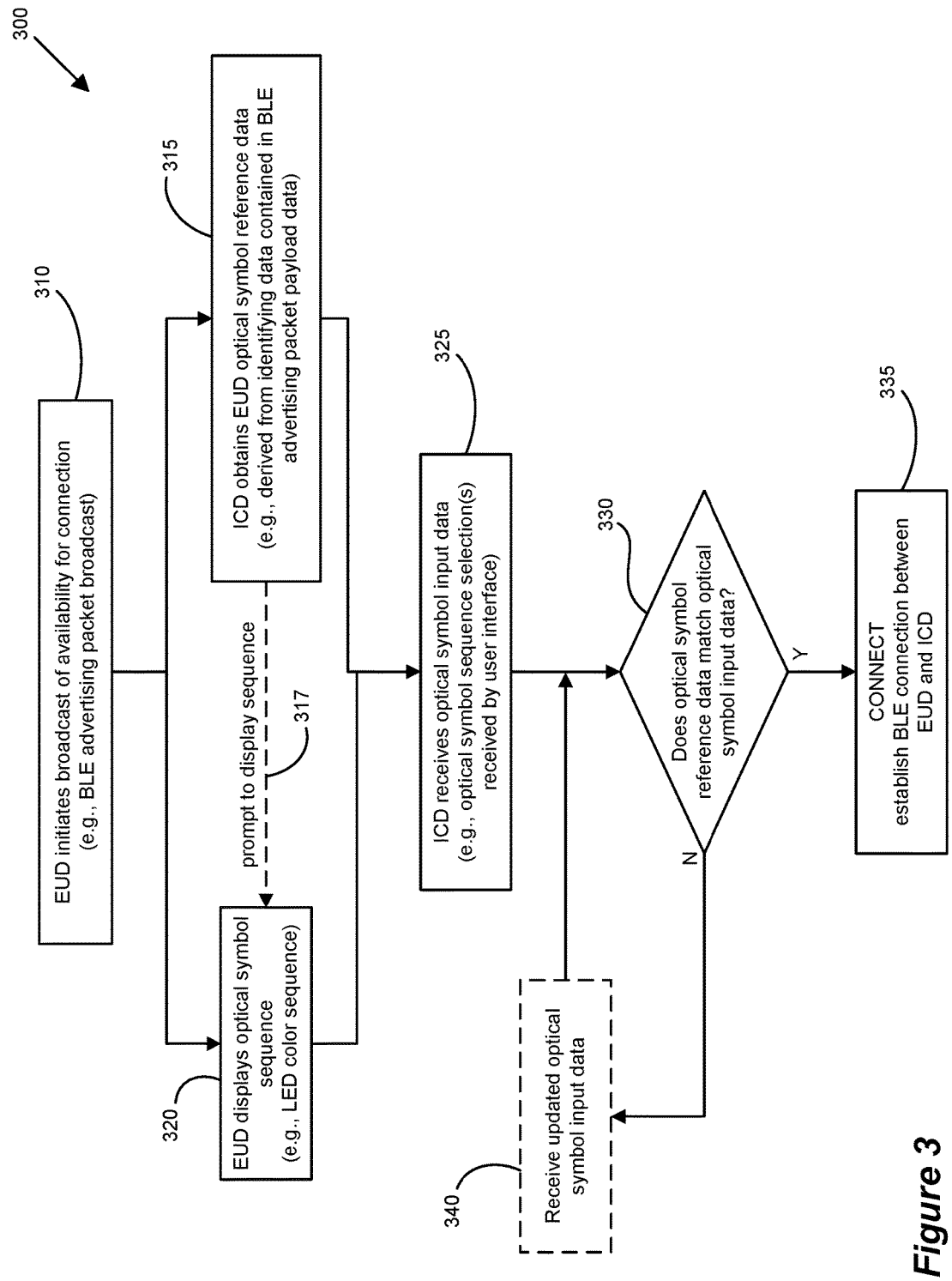
FIG. 3 illustrates one or more methods of operating a communication system.

Referring to FIG. 3, a method 300 of linking an end user device and an intermediate communication device using OSS communication linking in a communication system is shown. Method 300 is described with reference to exemplary elements, apparatus, systems and other information from FIGS. 1, 2A, 2B and 4. The description below references operations of FIG. 3 parenthetically.

As described in connection with FIGS. 1, 2A, 2B and 4, an ICD 130 may comprise a computing system (e.g., a cellphone, smartphone, gaming device, tablet, laptop or other computer) configured to communicate over a communication network 140 and to communicate with an associated EUD 110. Rather than using detailed or complex end user device identifying information (such as a serial number, MAC address, and/or other alphanumeric characters, text, or the like that functions as an identifier), some implementations of OSS communication linking utilize one or more optical symbol sequences in conjunction with an application 135 on an associated intermediate communication device 130 to enable the desired verification and connection(s).

To accomplish OSS communication linking between an end user device and an intermediate communication device, an optical symbol sequence acts as a proxy for more detailed end user device identifying information. To begin process 300 illustrated in FIG. 3, an EUD 110 initiates broadcast of its availability for connection (310). This can be done by broadcasting BLE advertising packets or the like (e.g., that contain identifying data from which optical symbol reference data can be derived), which are then received (315) by ICD 130 (e.g., if it is in BLE scanning mode). In some implementations communication application 135 derives optical symbol reference data from received identifying data, for example by processing (e.g., by applying an algorithm or other processing technique) digital, numeric or alphanumeric identifying data to generate the optical symbol reference data, which represents a color sequence. The EUD 110 displays (320) an optical symbol sequence (e.g., an LED-illuminated color sequence) that is similarly based on that end user device's identifying data. Display of the optical symbol sequence can be initiated once BLE advertising commences or can be in response to a prompt (317) sent by ICD 130 after it has received availability information that includes end user device identifying data.

Figure 4:
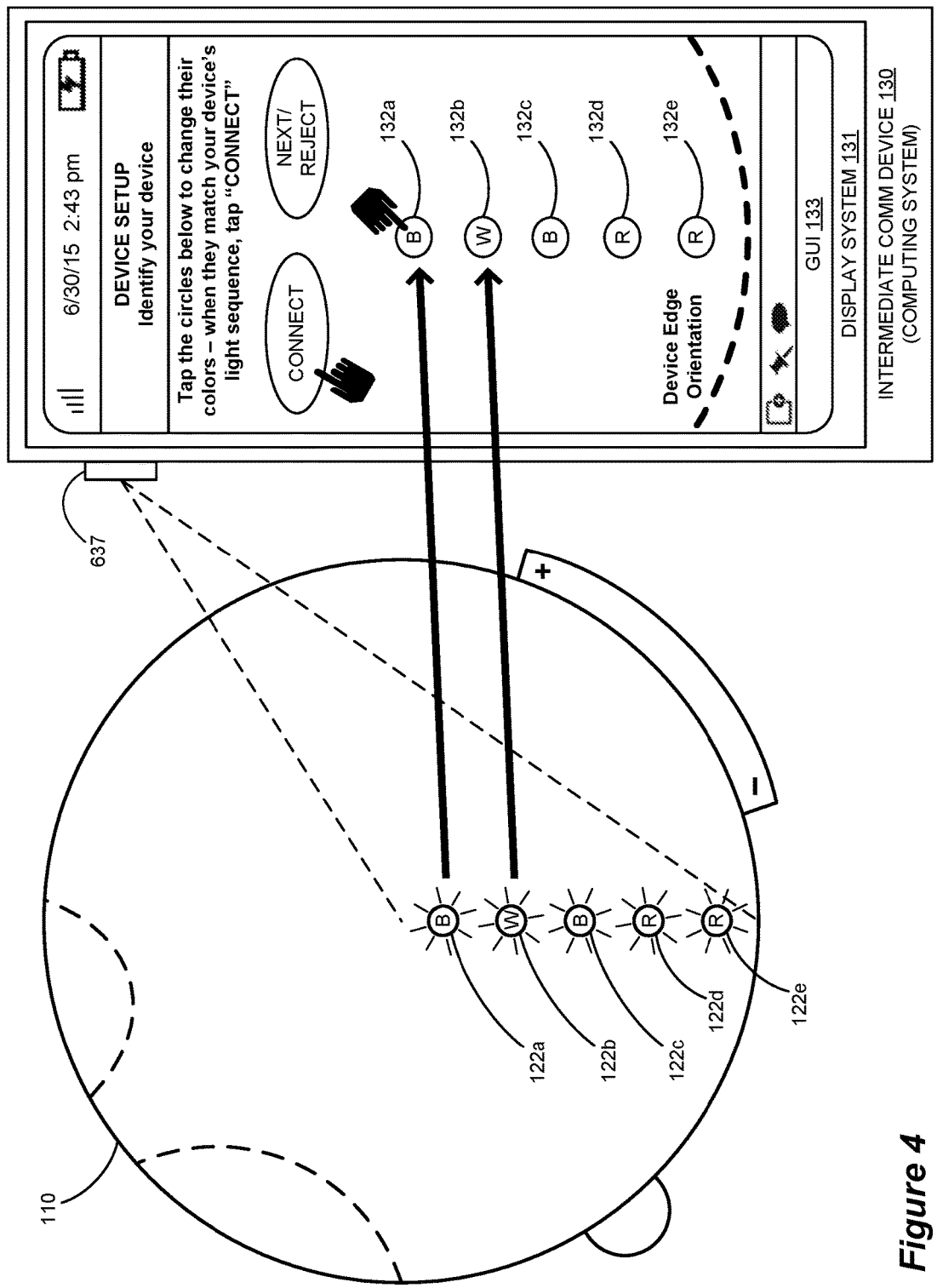
FIG. 4 illustrates one or more implementations of an end user device and an intermediate communication device apparatus and one or more methods of operating a communication system.

ICD 130 also receives optical symbol input data (325), which can be a plurality of optical symbol selections received at a user interface (e.g., sequenced color selections entered by a user on a display system device such as a touchscreen). Optical symbol selections may also be received via image capturing or the like. The user interface can be implemented as a GUI in connection with communication application 135 so that a user is able to select colors (or other optical symbols) and their sequence and enter the selections, for example via a touchscreen, keypad, voice command and/or otherwise. One non-limiting example of such a user interface is shown in FIG. 4, where an EUD 110 has an array of LEDs 122a, 122b, 122c, 122d, 122e with counterpart optical symbol input points 132a, 132b, 132c, 132d, 132e on the GUI 133 of a display system 131 of ICD 130. Each optical symbol input point 132a-e can comprise a selectable color image (e.g., a dot or circle). GUI 133 can be generated by communication application 135 as part of a device setup for EUD 110 and ICD 130. In the non-limiting example of FIG. 4, the optical symbol sequence of BLUE, WHITE, BLUE, RED, RED illuminated respectively on LEDs 122a, 122b, 122c, 122d, 122e of device 110 is reproduced after a user inputs the same color sequence on GUI 133.

If the optical symbol input data from the user interface of ICD 130 matches (330) the optical symbol reference data obtained by ICD 130 from the identifying data of EUD 110, then a connection between the devices is enabled (335). If there is no match then a user optionally may have the opportunity to re-enter or otherwise update the optical symbol input data (340).

Figure 5:
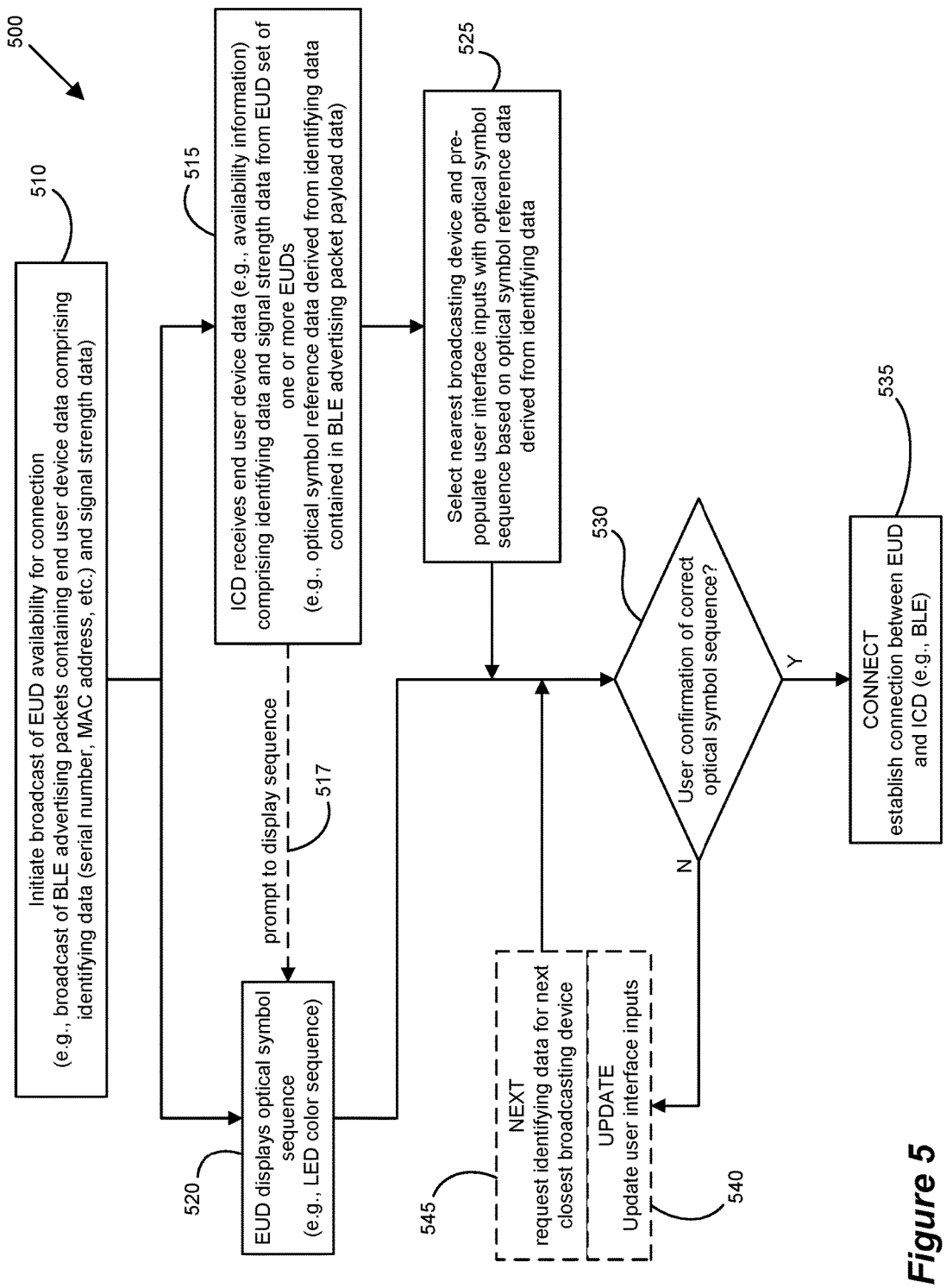
FIG. 5 illustrates one or more methods of operating a communication system.

Referring to FIG. 5, another method 500 of linking an end user device and an intermediate communication device using OSS communication linking in a communication system is shown. Method 500 is described with reference to exemplary elements, apparatus, systems and other information from FIGS. 1, 2A, 2B and 4. The description below references operations of FIG. 5 parenthetically.

As described in connection with FIGS. 1, 2A, 2B and 4, an ICD 130 may comprise a computing system (e.g., a cellphone, smartphone, gaming device, tablet, laptop or other computer) configured to communicate over a communication network 140 and to communicate with an associated EUD 110. As with method 300 described above, rather than using detailed identifying information from an end user device (e.g., a serial number, MAC address, and/or other alphanumeric characters, text, or the like), some implementations of OSS communication linking utilize one or more optical symbol sequences in conjunction with a communication application 135 on an ICD 130 to enable verification of a peripheral end user device and connection(s) between the correct devices. To accomplish OSS communication linking between an end user device and an intermediate communication device, an optical symbol sequence again can act as a proxy for detailed end user device identifying information.

To begin process 500 illustrated in FIG. 5, an EUD 110 initiates broadcast of the end user device's availability for connection (510), which includes end user device data. This can be done by broadcasting BLE advertising packets or the like that contain end user device data comprising: end user device signal strength data (e.g., RSSI or Tx Power data); and end user device identifying data (e.g., a device serial number, binary string, MAC address, and/or other alphanumeric characters, text, or the like that functions as an identifier or the like from which optical symbol reference data can be derived). Availability information broadcast by a set of end user devices in the same general vicinity (i.e., one or more EUDs that are broadcasting end user device data) can be received (515) by ICD 130 (e.g., if it is in BLE scanning mode).

Availability information broadcast by BLE advertisers frequently includes end user device signal strength data (e.g., a received signal strength indication (RSSI) or other signal strength data), which in BLE can include transmit power data ("Tx Power") or some other data concerning signal strength that is part of the advertising packets broadcast by a BLE device. In processing availability information received by ICD 130, communication application 135 does not have to determine or estimate how far away any particular device(s) might be. Instead, application 135 can select the nearest BLE device (by ranking devices based on received signal strength data), process whatever identifying data is provided in that nearest device's advertising packets, and pre-populate the color optical symbol input points of communication application 135 accordingly (525). Each optical symbol input point can comprise a selectable color image (e.g., a dot or circle). EUD 110 displays (520) an optical symbol sequence (e.g., an LED-illuminated color sequence), which can be displayed once advertising commences or in response to a prompt (517) sent by ICD 130 after it has received optical symbol reference data. In some implementations image capturing can be used to collect image data from which the optical symbol input data can be obtained and which a user can then merely confirm via a user interface or the like.

In this implementation ICD 130 processes the optical symbol reference data and pre-populates (525) the color code input points 132*a*, 132*b*, 132*c*, 132*d*, 132*e* on the GUI 133 as a graphical depiction of a sequence corresponding to the nearest BLE device's optical symbol reference data, as seen in FIG. 4. With the user interface fields pre-populated, the user need only confirm (530) the correct optical symbol sequence (e.g., by tapping "CONNECT") and establish a connection (535) or, if the pre-populated color sequence is incorrect, the user rejects the initial optical symbol reference data and optionally can either update the user interface inputs (540) to display the correct optical symbol sequence (e.g., by visually checking the display 122 on EUD 110) or can request (540) the identifying data for the second nearest (i.e., next-closest) BLE device, based on RSSI strength (e.g., by tapping "NEXT").

Figure 6:
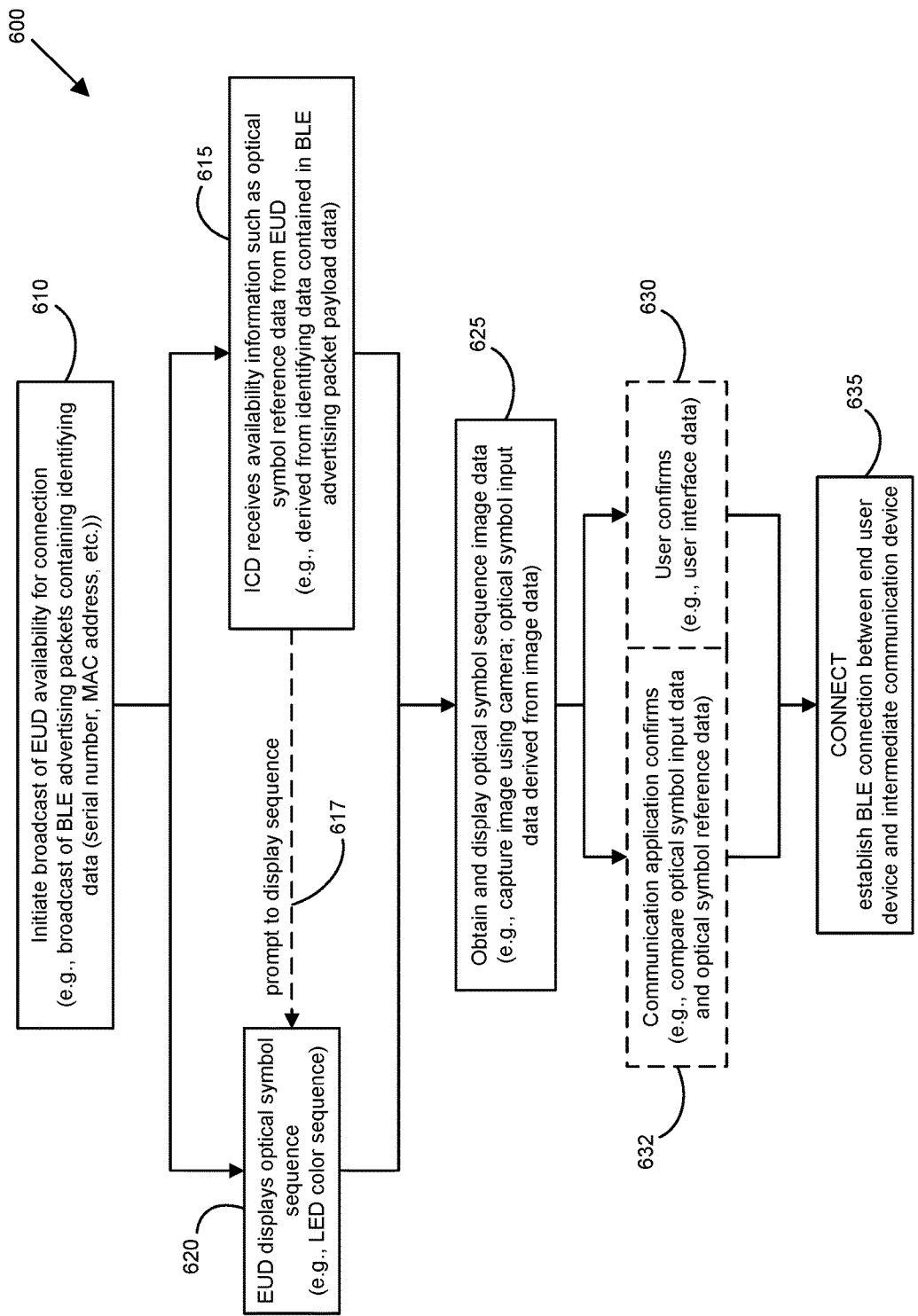
FIG. 6 illustrates one or more methods of operating a communication system.

Referring to FIG. 6, another method 600 of linking an end user device and an intermediate communication device using OSS communication linking in a communication system is shown in which image capture and/or image recognition is used. Method 600 is described with reference to exemplary elements, apparatus, systems and other information from FIGS. 1, 2A, 2B and 4. The description below references operations of FIG. 6 parenthetically.

As previously described in connection with FIGS. 1, 2A, 2B and 4, an ICD 130 may comprise a computing system (e.g., a cellphone, smartphone, gaming device, tablet, laptop or other computer) configured to communicate over a communication network 140 and to communicate with an associated EUD 110. As with methods 300 and 500 described above, rather than using detailed identifying information from an end user device (e.g., a serial number, MAC address, and/or other alphanumeric characters, text, or the like), some implementations of OSS communication linking use one or more optical symbol sequences in conjunction with a communication application 135 on ICD 130 to enable verification of a peripheral end user device and connection(s) between the correct devices. To accomplish OSS communication linking between an end user device and an intermediate communication device, an optical symbol sequence again can act as a proxy for detailed end user device identifying information.

To begin process 600 illustrated in FIG. 6, an end user device 110 initiates its broadcast of the end user device's availability for connection (610). This can be done by broadcasting BLE advertising packets or the like that contain availability information including device identifying data (e.g., a serial number, MAC address, and/or other alphanumeric characters, text, or the like that functions as an identifier or the like from which optical symbol reference data can be derived and that corresponds to the optical symbol sequence displayed by EUD 110). Availability information broadcast by EUD 110 is received (615) by ICD 130 (e.g., if it is in BLE scanning mode). EUD 110 displays (620) an optical symbol sequence (e.g., an LED-illuminated color sequence) that is similarly based on that device's identifying data. Display of the optical symbol sequence can be initiated once BLE advertising commences or can be in response to a prompt (617) sent by ICD 130 after it has received availability information that includes end user device identifying data.

As seen in FIG. 4, the computing system 130 (ICD 130) also can include an optical data acquisition device 637 (e.g., a camera or other reader built in or otherwise coupled to system 130). Optical data acquisition device 637 can acquire optical symbol sequence image data (625) from an image of optical symbol sequence 122 being displayed on EUD 110 (e.g., communication application 135 can instruct a user to point the camera 637 at EUD 110 to acquire the optical symbol sequence image data).

Communication application 135 can display (e.g., on a display system 131 of ICD 130) a replica of the optical symbol sequence displayed on EUD 110 by processing the optical symbol sequence image data to derive optical symbol input data. A user can confirm a match by using an input on GUI 133 (630), after which a connection is established (635) between EUD 110 and ICD 130. Alternatively, communication application 135 can perform the comparison (632) by comparing optical symbol reference data obtained from availability information broadcast by EUD 110 with the optical symbol reference data derived from the optical symbol sequence image data.

Figure 7:
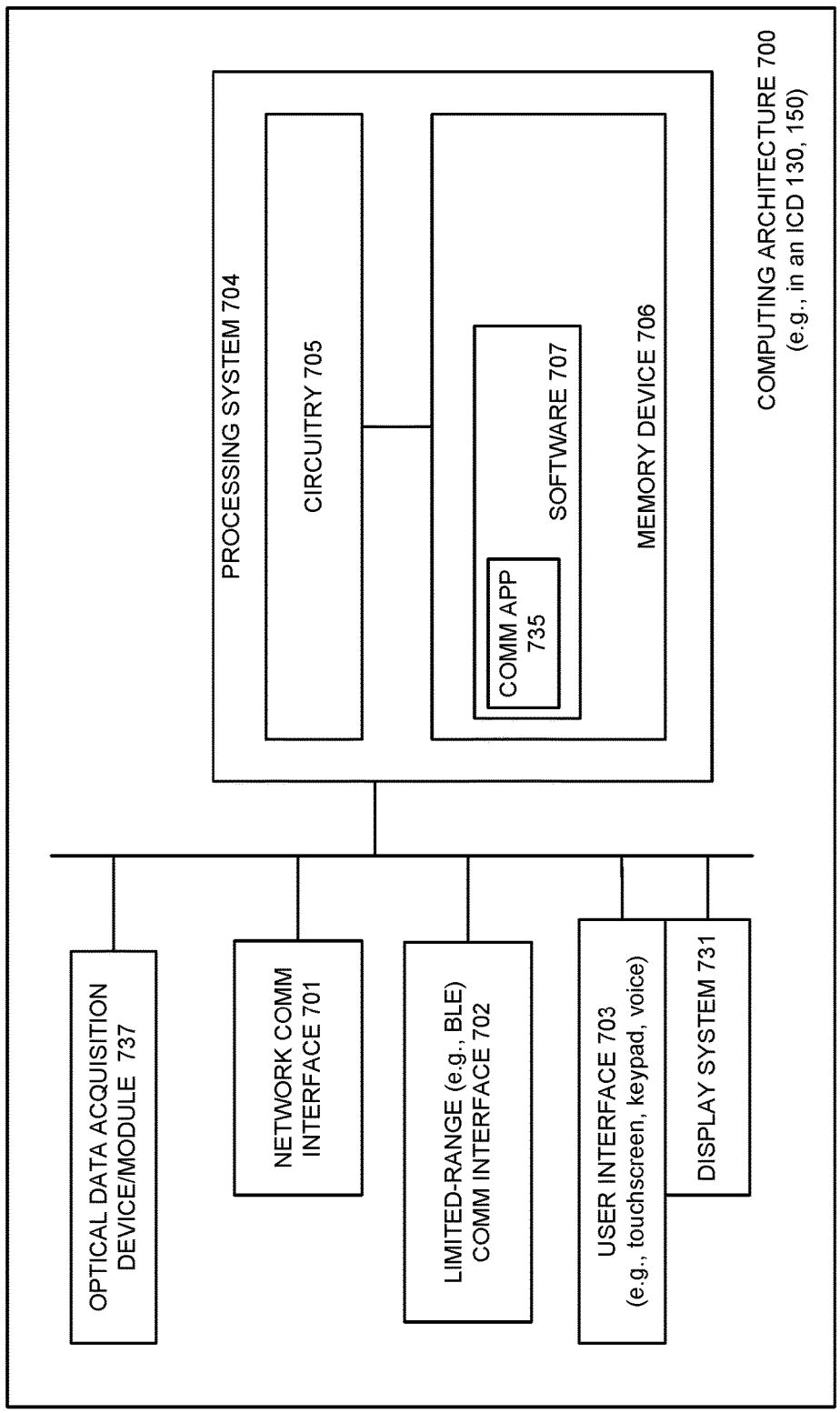
FIG. 7 illustrates a computing architecture to provide optical symbol sequence communication linking of devices including a wearable group communication end user device.

FIG. 7 illustrates a computing architecture 700 to implement the communication systems, devices, apparatus and processes in the Figures and/or described herein (non-limiting examples of which include the end user devices and intermediate communication devices). Computing architecture 700 is representative of a computing architecture that may be employed in an intermediate communication device such as ICDs 130, 150, or in any computing apparatus, system, or device, or collections thereof, to suitably implement one or more of the systems, devices, apparatus and processes in the Figures. Computing architecture 700 comprises network communication interface 701, limited-range communication interface 702, user interface 703, and processing system 704. Processing system 704 is communicatively linked to communication interfaces 701, 702 and user interface 703. Processing system 704 includes processing circuitry 705 and memory device 706 that stores operating software 707 (including communication application 735).

Network communication interface 701 comprises components that communicate over network and related communication links (e.g., including those extending outside a communication node), such as network cards, ports, RF transceivers, processing circuitry and software, or some other communication devices. Network communication interface 701 may be configured to communicate over metallic, wireless, or optical links. Network communication interface 701 also may be configured to use TDM, IP, Ethernet, optical networking, wireless protocols, communication signaling, or some other communication format—including combinations thereof. Limited-range communication interface 702 comprises components that communicate using a limited-range channel (e.g., Bluetooth low energy). User interface 703 comprises components that permit user interaction with computing architecture 700. User interface 703 can include a touchscreen, keyboard, display screen, voice command apparatus, mouse, touch pad, and/or other user input/output apparatus.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 may include any number of software modules to provide the communication operations described herein. Operating software 707 may further include an operating system, utilities, drivers, network interfaces, applications, or some other type of software. When executed by circuitry 705, operating software 707 directs processing system 704 to operate computing architecture 700 as described herein to provide one or more implementations of optical symbol sequence communication linking and other communications. Also connected to the processing system 704 and interfaces 701, 702 in some implementations are a display system 731 (which may be the same or included in the user interface 703) and an optical data acquisition device 737 (e.g., a camera or other reader built in or otherwise coupled to system 704 that enables acquisition of image data and the like). Display system 731 and optical data acquisition device 737 can be configured to operate as herein described in connection with one or more implementations of optical symbol sequence communication linking.

In some implementations, each end user device can be implemented in a half-duplex type of operational mode. That is, a device in a communication node linked to a communication group or the like can transmit and receive, but cannot do both at the same time. A "push-to-talk" operational mode allows an end user to press a transmit toggle button or the like (e.g., by pushing and holding top cover 111 of device 110 as depicted by arrow 126 in FIG. 2B) to initiate sending a voice communication to one or more users in the communication group. While the toggle is in its "transmit" position (e.g., with cover 111 depressed), the end user device is configured to collect audio data from the user (e.g., recording voice communications). This can be done in a variety of ways. The collected audio data can be held in the end user device or in a linked intermediate communication device (e.g., a smartphone, cellphone, gaming device, tablet, or laptop). When the toggle is switched back to its "receive" position, any collected audio data is transmitted to the one or more communication group members. The collected audio data can be transmitted using any appropriate transmission scheme. In one non-limiting example discussed below, audio data collected by an end user device can be transmitted to its linked intermediate communication device via one of the Bluetooth modes. Likewise, audio data collected by an intermediate communication device can be send over a broader network using any appropriate communication protocol or scheme.

Figure 8A:
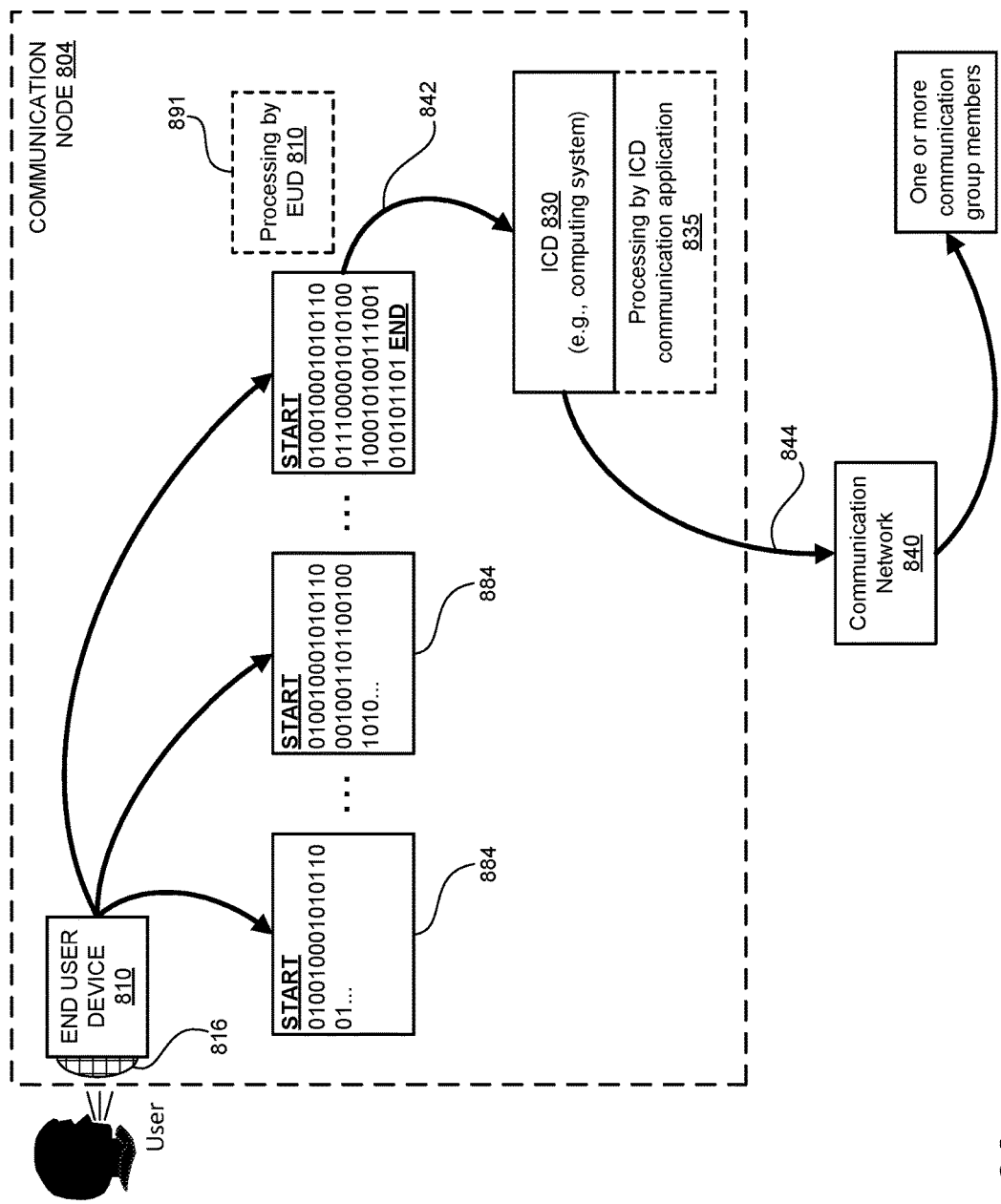
FIG. 8A illustrates an operational example in an implementation.

In one implementation, a non-limiting example of which is illustrated in FIG. 8A, a communication node 804 includes an end user device 810 that has a microphone 816 configured to collect audio data from a human user. As illustrated in FIG. 8A, the end user device 810 begins storing the collected audio data in a memory location 884. This audio data collection process continues until the a push-to-talk button on end user device 810 is released (i.e., the END signal in FIG. 8A). Some additional processing 891 may be performed by end user device 810 before the collected audio data is transmitted at 842 to an intermediate communication device 830 that also is part of communication node 804. Again, some additional processing 835 may be performed by ICD 830 before it transmits at 844 the audio data to one or more additional communication group members via communication network 840. In some implementations, multiple members of a group can be collecting audio data, though while an EUD 810 or the like is collecting such audio data (i.e., while the push-to-talk button is in its transmit position) the ICD 830 and/or EUD 810 cannot play back audio data received from another user.

Figure 8B:
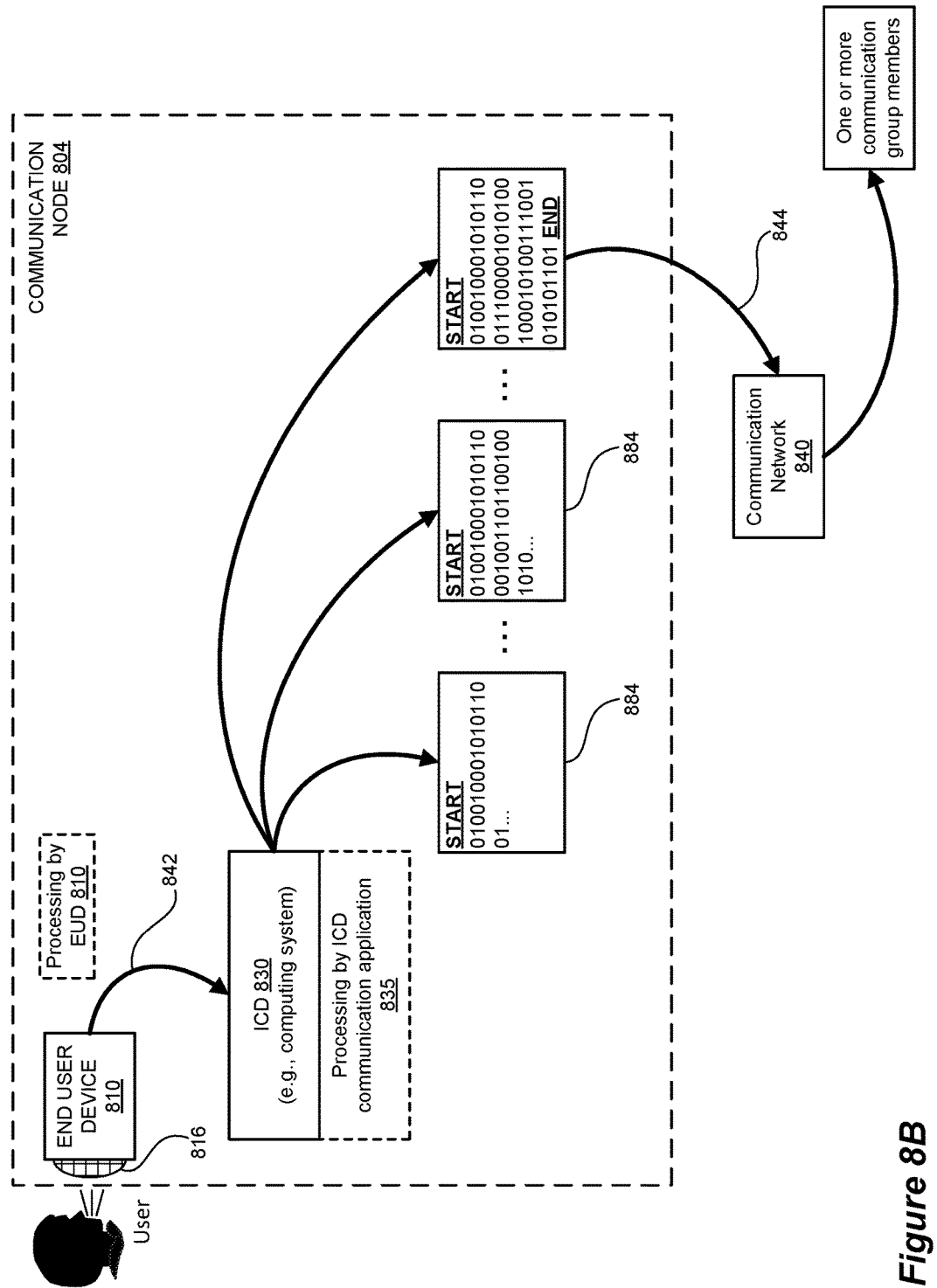
FIG. 8B illustrates an operational example in an implementation.

In another non-limiting example shown in FIG. 8B, it is the intermediate communication device 830 that stores the collected audio data before it is transmitted via network 840. The end user device 810 may process audio data collected from a user prior to transmission at 843 to the ICD 830 (e.g., the collected audio data may be encrypted, buffered to permit error correction, assembled into packets, etc.). The intermediate communication device 830 builds the audio data until the push-to-talk button on the EUD 810 is switched back to receive, at which point the ICD 830 can transmit the collected audio data to network 840 and thus to one or more communication group members or the like.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of enabling two-way audio communication between a first portable end user device and a communication network through an intermediate communication device linked to the communication network, the method comprising the intermediate communication device:

establishing an audio communication connection between the portable first end user device and the intermediate communication device, wherein establishing the communication connection comprises:
  receiving end user device data from each portable end user device in a portable end user device set, the portable end user device set comprising one or more portable end user devices, wherein the end user device data received from each portable end user device in the portable end user device set comprises:
    end user device identifying data; and
    end user device signal strength data;
  identifying the first portable end user device in the portable end user device set based on the received end user device signal strength data from each portable end user device in the portable end user device set, wherein the first portable end user device is the portable end user device in the portable end user device set that is nearest to the intermediate communication device;
  deriving first optical symbol reference data from the first portable end user device's identifying data;
  pre-populating an intermediate communication device user interface to provide a graphical depiction corresponding to the first optical symbol reference data;
  receiving one of the following inputs from the intermediate communication device user interface:
    confirmation of the first optical symbol reference data; or
    rejection of the first optical symbol reference data; and
  initiating the audio communication connection with the first portable end user device when confirmation of the first optical symbol reference data is received, and
linking the first portable end user device and the communication network via the intermediate communication device for two-way audio communication using the audio communication connection;
wherein each portable end user device in the portable end user device set comprises:
  a microphone,
  a speaker,
  user-controlled means for initiating broadcasting of end user device identifying data and end user device signal strength data, and
  user-controlled means for controlling toggling between audio transmit and receive.

2. The method of claim 1 wherein the end user device identifying data for each portable end user device in the portable end user device set comprises at least one of the following:
  a serial number of the portable end user device;
  a MAC address of the portable end user device;
  an identifier of the portable end user device; or
  an alphanumeric character string identifier of the portable end user device.

3. The method of claim 1 wherein the intermediate communication device user interface comprises a graphical user interface and at least one of the following:
  a touchscreen;
  a keypad; or
  voice command apparatus.

4. The method of claim 1 wherein, when confirmation of the first optical symbol reference data is received, the first optical symbol reference data corresponds to a first optical symbol sequence displayed on the first portable end user device, wherein the first optical symbol sequence comprises a first plurality of optical symbols displayed on the first portable end user device.

5. The method of claim 4 wherein the first plurality of optical symbols displayed on the first portable end user device comprises one of the following:
  a first color sequence on a sticker applied to the portable end user device;
  a first color sequence on a label applied to the portable end user device;
  a first color sequence on a decal applied to the portable end user device; or
  a first color sequence generated by a plurality of multi-color light-emitting diodes, wherein the portable end user device comprises the plurality of multi-color light-emitting diodes.

6. The method of claim 1 wherein the graphical depiction corresponding to the first optical symbol reference data comprises the intermediate communication device displaying pre-populated optical symbol input points on an intermediate communication device display system, wherein each optical symbol input point comprises a selectable color image.

7. The method of claim 1 wherein the audio communication connection comprises a Bluetooth low energy communication connection.

8. The method of claim 1 wherein the received end user device data is transmitted to the intermediate communication device using Bluetooth low energy advertising packets, wherein each Bluetooth low energy advertising packet comprises end user device data.

9. The method of claim 1 wherein the intermediate communication device comprises:
  a tablet;
  a smartphone;
  a laptop computer; or
  a cellphone.

10. The method of claim 1 wherein, when rejection of the first optical symbol reference data is received, the method further comprises:
  identifying a second portable end user device in the portable end user device set based on the received end user device signal strength data from each portable end user device in the portable end user device set, wherein the second portable end user device is the portable end user device in the portable end user device set that is second nearest to the intermediate communication device;
  deriving second optical symbol reference data from the second portable end user device's identifying data;
  pre-populating the intermediate communication device user interface to provide a graphical depiction corresponding to the second optical symbol reference data;
  receiving one of the following inputs from the intermediate communication device user interface:
    confirmation of the second optical symbol reference data; or
    rejection of the second optical symbol reference data; and
  initiating the audio communication connection with the second portable end user device when confirmation of the second optical symbol reference data is received.

11. A computer readable storage medium having a communication application stored thereon, the communication application including instructions, which when executed by one or more processors of an intermediate communication device, cause the intermediate communication device to:

scan for and receive Bluetooth low energy advertising packets comprising end user device data from each portable end user device in a portable end user device set, the portable end user device set comprising one or more portable end user devices, wherein the end user device data received from each portable end user device in the portable end user device set comprises:
  end user device signal strength data; and
  end user device identifying data, wherein end user device identifying data comprises at least one of the following:
    a serial number of the portable end user device;
    a MAC address of the portable end user device;
    an identifier of the portable end user device; or
    an alphanumeric character string identifier of the portable end user device;
identify a first portable end user device in the portable end user device set based on the received end user device signal strength data from each portable end user device in the portable end user device set, wherein the first portable end user device is the portable end user device in the portable end user device set that is nearest to the intermediate communication device;
derive first optical symbol reference data from the first portable end user device's identifying data;
pre-populate an intermediate communication device user interface to provide a graphical depiction corresponding to the first optical symbol reference data;
receive one of the following inputs from the intermediate communication device user interface:
  confirmation of the first optical symbol reference data; or
  rejection of the first optical symbol reference data;
initiate an audio communication connection with the first portable end user device when confirmation of the first optical symbol reference data is received; and
link the first portable end user device and a communication network via the intermediate communication device for two-way audio communication using the audio communication connection;
wherein each portable end user device in the portable end user device set comprises:
  a microphone,
  a speaker,
  user-controlled means for initiating broadcasting of end user device identifying data and end user device signal strength data, and
  user-controlled means for controlling toggling between audio transmit and receive.

12. The computer readable storage medium of claim 11 wherein the intermediate communication device comprises one of the following:
  a tablet;
  a smartphone;
  a laptop computer; or
  a cellphone; and
  further wherein the intermediate communication device user interface comprises a graphical user interface and at least one of the following:
    a touchscreen;
    a keypad; or
    voice command apparatus.

13. The computer readable storage medium of claim 11 wherein, when confirmation of the first optical symbol reference data is received, the first optical symbol reference data corresponds to a first optical symbol sequence displayed on the first portable end user device, wherein the first optical symbol sequence comprises a first plurality of optical symbols displayed on the first portable end user device.

14. The computer readable storage medium of claim 13 wherein the first plurality of optical symbols displayed on the first portable end user device comprises one of the following:
  a first color sequence on a sticker applied to the portable end user device;
  a first color sequence on a label applied to the portable end user device;
  a first color sequence on a decal applied to the portable end user device; or
  a first color sequence generated by a plurality of multi-color light-emitting diodes, wherein the portable end user device comprises the plurality of multi-color light-emitting diodes.

15. The computer readable storage medium of claim 11 wherein the graphical depiction corresponding to the first optical symbol reference data comprises the intermediate communication device displaying pre-populated optical symbol input points on an intermediate communication device display system, wherein each optical symbol input point comprises a selectable color image.

16. A communication system configured to facilitate secure audio communications between multiple nodes in a distributed communication environment, the communication system comprising:
  a communication device comprising:
    one or more processors;
    a computer readable storage medium having instructions stored thereon that, when executed by the one or more processors, cause the communication device to:
      scan for and receive Bluetooth low energy advertising packets comprising end user device data from each portable end user device in a portable end user device set, the portable end user device set comprising one or more portable end user devices, wherein the end user device data received from each portable end user device in the portable end user device set comprises:
        end user device signal strength data; and
        end user device identifying data, wherein end user device identifying data comprises at least one of the following:
          a serial number of the portable end user device;
          a MAC address of the portable end user device;
          an identifier of the portable end user device; or
          an alphanumeric character string identifier of the portable end user device;
      identify a first portable end user device in the portable end user device set based on the received end user device signal strength data from each portable end user device in the portable end user device set, wherein the first portable end user device is the portable end user device in the portable end user device set that is nearest to the communication device;
      derive first optical symbol reference data from the first end user device's identifying data;
      pre-populate a user interface to provide a graphical depiction corresponding to the first optical symbol reference data, wherein the user interface comprises at least one of the following:
        a touchscreen;
        a keypad; or
        voice command apparatus;

receive one of the following inputs from the user interface:
  confirmation of the first optical symbol reference data; or
  rejection of the first optical symbol reference data; and
initiate a Bluetooth low energy audio communication connection with the first portable end user device when confirmation of the first optical symbol reference data is received; and
link the first portable end user device and a communication network via the communication device for two-way audio communication using the audio communication connection;
wherein each portable end user device in the portable end user device set comprises:
  a microphone,
  a speaker,
  user-controlled means for initiating broadcasting of end user device identifying data and end user device signal strength data, and
  user-controlled means for controlling toggling between audio transmit and receive.

17. The communication system of claim 16 wherein, when confirmation of the first optical symbol reference data is received, the first optical symbol reference data corresponds to a first optical symbol sequence displayed on the first portable end user device, wherein the first optical symbol sequence comprises a first plurality of optical symbols comprising a first color sequence generated by a plurality of multi-color light-emitting diodes, wherein the first portable end user device comprises the plurality of multi-color light-emitting diodes.

18. The communication system of claim 17 wherein the portable first end user device comprises a wearable device configured to operate as a push-to-talk device.

19. The communication system of claim 16 wherein the communication device comprises one of the following:
  a tablet;
  a smartphone;
  a laptop computer; or
  a cellphone.

20. The communication system of claim 16 wherein the graphical depiction corresponding to the first optical symbol reference data comprises the communication device displaying pre-populated optical symbol input points on a communication device display system, wherein each optical symbol input point comprises a selectable color image.

* * * * *